May 8, 1956  J. A. VAN ALLEN  2,744,697
COSMIC RAY ALTIMETER
Filed June 25, 1952

JAMES A. VAN ALLEN
INVENTOR

BY
ATTORNEYS

United States Patent Office 2,744,697
Patented May 8, 1956

2,744,697
COSMIC RAY ALTIMETER

James A. Van Allen, Iowa City, Iowa, assignor to the United States of America as represented by the Secretary of the Navy Application June 25, 1952, Serial No. 295,516

11 Claims. (Cl. 244—14)

This invention relates generally to altitude indicating devices, and more particularly it relates to a cosmic ray altimeter for determining the altitude of the missile or vehicle containing the altimeter as a complete function of the counting rates of two Geiger counters contained therein.

Heretofore, altitudes of aerial missiles and aerial vehicles have been determined by utilizing the counting rate of a single Geiger counter. However, this involves difficulties in exact determination of altitude. The present invention reduces such difficulties for the reason that it is based on two comparative counter circuits whose outputs are balanced when a predetermined altitude of the aerial vehicle or aerial missile containing the apparatus has been attained.

It is an object of this invention to provide apparatus for determining a definite altitude of an aerial missile or aerial vehicle, and one which may be used to maintain a guided aerial missile or aerial vehicle at a desired height of travel above the earth's surface, within the range of approximately 50,000 to 100,000 feet altitude.

Another object of the invention is to provide passive apparatus for accurately determining altitude of an aerial missile or aerial vehicle, that is, one that does not emit radio signals, and consequently does not reveal the presence of an aerial missile or aerial vehicle to any observer by virtue of its operation.

Still another object of the invention is to provide apparatus for determining missile altitude in which its readings are unaffected by missile acceleration, missile velocities, and one whose operation is based on fundamental and dependable phenomena in the upper atmosphere.

Other objects and many of the attendant advantages of this invention will be appreciated as the same becomes understood by reference to the following detailed description, when considered in connection with the accompanying drawings, wherein.

In accordance with the invention, an improved cosmic ray altimeter is provided for determining the altitude of an aerial missile or aerial vehicle containing such altimeter. The altimeter comprises two Geiger counters which are responsive to cosmic rays. One of the Geiger counters is exposed directly to cosmic radiation, whereas the other is partially shielded, such that the altitude of the aerial missile or aerial vehicle carrying the altimeter is determinable as a complete function of the counting rates of the two counters.

Figure 1:
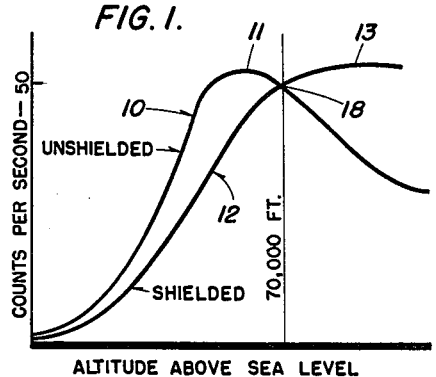
Fig. 1 shows two curves, plotted on the same chart, illustrating the counting responses of an unshielded and a shielded Geiger counter.

Referring first to the curves shown in Fig. 1, the abscissas of the graph or chart represent altitudes above the earth's mean surface, and the ordinates thereof the cosmic ray intensities corresponding thereto, as indicated by conventional Geiger tubes in suitable counting circuits to be described presently. The curve 10 marked "Unshielded" is that obtained with an unshielded Geiger tube, and it will be noted that it rises gradually to a maximum or a "crest" 11 and then declines with further increase of altitude. This is the normal type of curve and the feature of interest to the present invention is that a descending portion follows the crest 11.

The curve 12 marked "Shielded" is obtained by enclosing the corresponding Geiger tube in a lead sheath of moderate thickness, say 3 inches. It differs from the "unshielded" curve 10 in starting at a lower count value for zero altitude, but lacks the crest 11 and rises more or less uniformly to a value 13 that exceeds the crest 11 or maximum of the first curve 10. The reason for this lies in the fact that secondary particles are produced by the high intensity primary constituents of the cosmic radiation, upon entering the lead sheath, and these secondary particles increase the counting rate correspondingly.

Figure 2:
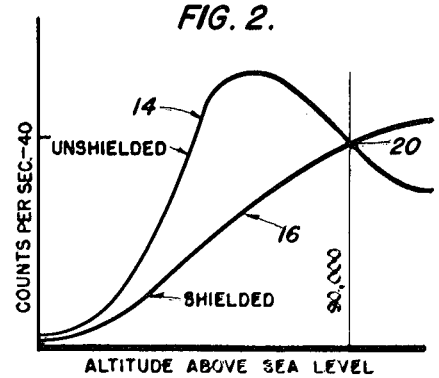
Fig. 2 shows two curves, plotted on the same chart, illustrating the counting responses of an unshielded Geiger counter and a shielded Geiger counter, the latter having a greater thickness of lead shield than for the arrangement shown in Fig. 1.

In Fig. 2, the "unshielded" curve 14 is identical with that of Fig. 1, but the "Shielded" curve 16 differs from the corresponding one of Fig. 1 in being substantially stretched out to the right. The greater thickness of the lead sheath diminishes the counts at lower altitudes but does not otherwise greatly alter the nature of the curve.

Referring again to Fig. 1, it will be seen that there the two curves 10 and 12 intersect at a point 18 that corresponds to the altitude of 70,000 feet, while in Fig. 2, the curves 14 and 16 intersect at a point 20 corresponding to 90,000 feet. The count rates at 18 and 20 are 50 and 40 counts per second. With this background, the apparatus will now be described.

Figure 3:
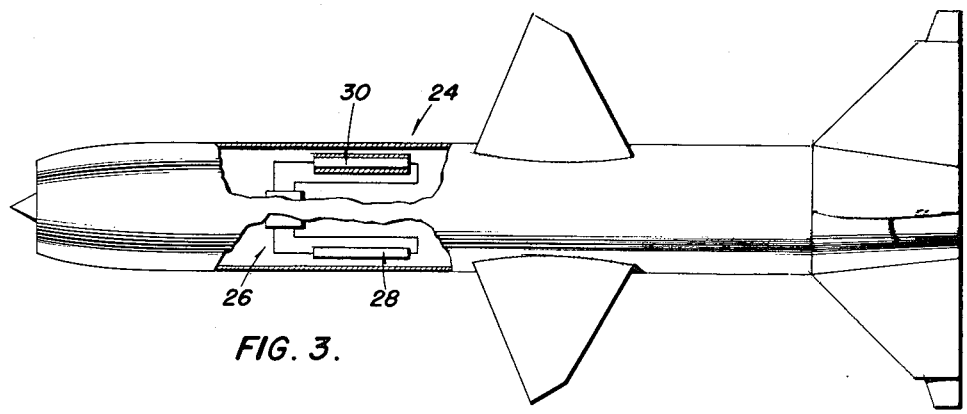
Fig. 3 is a schematic of an aerial missile, embodying the features of the invention.

In Fig. 3, there is shown an aerial missile 24, for example, of the ramjet or rocket type, having the apparatus 26, comprising the present invention, mounted therein. An unshielded Geiger counter tube 28 and a shielded Geiger counter tube 30 are shown schematically in missile 24.

Figure 4:
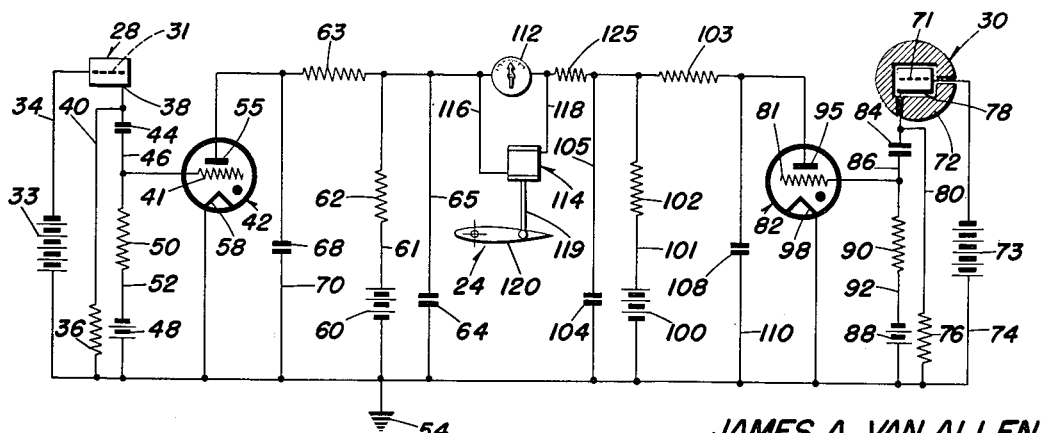
Fig. 4 is a circuit diagram of the apparatus embodying the invention.

Apparatus 26 is shown in greater detail in Fig. 4. Here there is illustrated the unshielded Geiger counter tube 28, having its central electrode 31 kept at a high potential by a suitable source 33 of electricity, connected thereto by lead 34. A high-resistance resistor 36 connected between power source 33 and the outer conductor 38 of tube 28 by a lead 40 completes the counter circuit. The outer conductor 38 of the Geiger counter tube 28 is shown connected capacitatively to the grid 41 of a thyratron 42, in such way that whenever a cosmic ray particle passes through the tube 28 a current pulse will traverse resistor 36, producing a voltage drop therein which will pulse the grid 41 of thyratron 42. A power source 48 and a resistor 50 are connected by lead 52 between the grid 41 of thyratron 42 and ground 54.

Upon the grid 41 being pulsed, the thyratron 42 becomes conducting and a pulse of current will pass through the anode 55-cathode 48 circuit thereof. The thyratron 42 is energized by a suitable source 60 of electricity. The latter is connected by lead 61 to the thyratron anode 55 through a first resistor 62 of suitably high resistance and a second resistor 63. A capacitor 64 is connected by lead 65 in series with source 60 and resistor 62 and another capacitor 68 is connected by lead 70 between the anode 55 of thyratron 42 and ground 54, in such ways that the capacitors 64 and 68 become charged through the resistors 62 and 63.

The thyratron 42 discharge puleses will be supplied mainly from the capactior 68, and the thyratron 42 will be quenched automatically when the voltage of capacitor 68 drops too low to maintain a sustaining current through the resistors 62 and 63 and the thyratron anode 55.

The circuit just described is duplicated for the shielded Geiger counter tube 30, having a lead shield or sheath 72. Elements 73, 74, 76, 78, 80, 81, 82, 84, 86, 88, 90, 92, 95, 98, 100, 101, 102, 103, 104, 105, 108 and 110 are exact duplicates of elements 33, 34, 35, 38, 40, 41, 42, 44, 46, 48, 50, 52, 55, 58, 60, 61, 62, 63, 64, 65, 68 and 70, respectively, are connected in the same manner, and operate in the same way, the only difference between the left and right halves of Fig. 4 being in the shield or sheath 72 for the Geiger counting tube 30, which is absent from the Geiger counting tube 28, and a resistor 125 which is located in the right half of the circuit. This resistor 125 is used to keep the power supplies 60 and 100 from loading each other, or the circuits from loading each other.

A meter 112 is provided common to both circuits, and it is preferably sufficiently damped to give a substantially steady deflection due to the rapidly-successive pulses flowing into the capacitors from source 60.

Consequently, when meter 112 reads zero, this means that the counting tubes 28 and 30 are counting at the same rate. Reference to the intersection 18 of the curves 10 and 12 of Fig. 1 shows that this denotes an altitude of 70,000 feet, assuming say the 3" lead shield On the other hand, with the thicker lead shield of Fig. 2, such zero reading on the meter 112 might designate 90,000 feet. The important feature is that every such "zeroing" will denote some definite altitude, determined by the lead shield alone. Preferably the meter 112 is of the zero-center type. A relay may be substituted in some cases.

The apparatus and circuitry described above can be used for automatically controlling the height of travel of an aerial missile or aerial vehicle, such as 24, equipped with an altimeter according to the present invention. This can be accomplished by using the voltage output of the systems to control a solenoid control arrangement 114 connected to the circuitry by leads 116 and 118. Solenoid 114, in turn, could be made to control a lever arrangement 119 attached to one of the wings 120 of aerial missile or aerial vehicle 24. Thus, depending upon the direction of operation of solenoid control arrangement 114, the wing 120 of the missile would be adjusted in one direction or the other to maintain the desired altitude.

Some of the important advantages of the altimeter of the present invention reside in the altimeter being a "passive instrument," that is, the altimeter does not emit radio signals, and consequently the presence of the aerial missile or vehicle is not revealed to any observer by virtue of its operation. In addition, its readings are not affected by missile accelerations, missile velocities and its operation is based on fundamental and dependable phenomena in the upper atmosphere.

Obviously many modifications and variations of the present invention are posible in the light of the above teachings. It is therefore to be understood that within the scope of the appended claims the invention may be practiced otherwise than as specifically described.

What is claimed is:

1. In combination with an aerial missile, unshielded means mounted in said missile and responsive to cosmic radiation when said missile is in flight in the upper atmosphere, shielded means mounted in said missle and partially exposed to said cosmic radiation, an electrical circuit for said unshielded means and said shielded means, the voltage output of said circuit being a function of the effectiveness of the shielding of said shielded means, and means responsive to said voltage output for controlling the altitude of said missle.

2. In combination with an aerial missle, an altimeter comprising a first means responsive to cosmic radiation, a second means also responsive to cosmic radiation, said first means being exposed directly to said cosmic radiation when said missile is in flight in the upper atmosphere, said second means being shielded to said cosmic radiation when said missile is in flight in the upper atmosphere, an electrical circuit for said first and said second responsive means, the voltage output of said circuit being the counting rates of said first and second responsive means, and means responsive to said voltage output for controlling the altitude of said missile.

3. In combination, an aerial missile, an altimeter mounted in said missile, said altimeter including a pair of Geiger counter tubes which are responsive to cosmic radiation, one of said counter tubes being unshielded and exposed directly to said cosmic radiation when said missile is in flight, the other of said counter tubes being a circuit including said counter tubes and giving a voltage output, and means for utilizing said voltage output to control the altitude of said missile, whereby when said missile is in flight, the altitude thereof is completely determined by the counting rates of said counters.

4. In combination, an aerial missile, an altimeter mounted in said missile, said altimeter including a pair of Geiger counter tubes which are responsive to cosmic radiation, one of said counter tubes being unshielded and exposed directly to said cosmic radiation when said missile is in flight, the other of said counter tubes being enclosed in a lead sheath, a circuit including said counter tubes and giving a voltage output, and means for utilizing said voltage output to control the altitude of said missile, whereby when said missile is in flight, the altitude thereof is completely determined by the counting rates of said counters.

5. An arrangement as set forth in claim 4, wherein said utilizing control means comprises a solenoid and lever arrangement.

6. In combination with an aerial missile, a first means fully responsive to cosmic radiation when said missile is in flight in the upper atmosphere, a second means partially shielded to other cosmic radiation, a separate circuit for each of said first and second means, a further circuit having means for combining the voltage outputs of said separate circuits such that the voltage output of said further circuit is a function of the effectiveness of the shielding of said second responsive means, and means responsive to said voltage output of said further circuit for controlling the altitude of said missile.

7. In combination with an aerial missile, unshielded means mounted in said missile and fully responsive to cosmic radiation when said missile is in flight in the upper atmosphere, shielded means mounted in said missile and partially exposed to other cosmic radiation, a separate electrical circuit for each of said first and second responsive means, a further electrical circuit having means for combining the voltage outputs of said separate circuits such that the voltage output of said further circuit is a function of the effectiveness of the shielding of said shielded means, and means responsive to said voltage output of said further circuit for controlling the altitude of said missile.

8. In combination with an aerial missile, a first means responsive to cosmic radiation, a second means also responsive to other cosmic radiation, said first means being exposed directly to said cosmic radiation when said missile is in flight in the upper atmosphere, said second means being partially shielded to said other cosmic radiation, a separate electrical circuit for each of said first and second responsive means, a further electrical circuit having means for combining the output voltages of said separate circuits so that the voltage output of said further circuit is a function of the effectiveness of the shielding of said second responsive means and is completely determined by the counting rates of said first and second responsive means, and means responsive to said voltage output for controlling the altitude of said missile.

9. A cosmic ray altimeter, comprising, unshielded means responsive to cosmic radiation, shielded means partially exposed to other cosmic radiation, a separate electrical circuit for each of said unshielded and shielded means, a further electrical circuit for combining the voltage outputs of said separate circuits such that the voltage output of said further circuit is a function of the effectiveness of shielding of said shielded means.

10. A cosmic ray altimeter, comprising, a first means responsive to cosmic radiation, a second means also responsive to other cosmic radiation, said first means being exposed directly to said cosmic radiation, said second means being partially shielded to said other cosmic radiation, a separate electrical circuit for each of said first and second responsive means, a further electrical circuit for combining the voltage outputs of said separate circuits such that the voltage output of said further circuit is a function of the amount of exposure of said second responsive means.

11. An altimeter including a pair of Geiger counter tubes, one of said tubes being unshielded and exposed directly to cosmic radiation when said altimeter is in the upper atmosphere, the other of said counter tubes being enclosed in a lead sheath and partially responsive to other cosmic radiation in the upper atmosphere, a separate electrical circuit for each of said counter tubes, and a further electrical circuit for combining the voltage outputs of said separate circuits such that the voltage output from said further circuit is utilized for controlling the altitude of said body carrying said altimeter, whereby when said altimeter is in said upper atmosphere, the altitude of the body carrying said altimeter is completely determined by the counting rates of said counters.

References Cited in the file of this patent
UNITED STATES PATENTS

| | | |
|---|---|---|
| 2,415,429 | Kellogg 2d et al. | Feb. 11, 1947 |
| 2,513,818 | Roop | July 4, 1950 |
| 2,573,823 | Barghausen et al. | Nov. 6, 1951 |
| 2,647,214 | Penney | July 28, 1953 |